United States Patent
Nicol et al.

(10) Patent No.: US 9,045,571 B2
(45) Date of Patent: Jun. 2, 2015

(54) FREE RADICAL POLYMERISATION OF ETHYLENE INITIATED BY ORGANIC PEROXIDES WITH HIGH PRODUCTIVITY

(75) Inventors: Pascal Nicol, Saint Genis Laval (FR); Serge Hub, Villeurbanne (FR)

(73) Assignee: ARKEMA FRANCE, Colombes (FR)

( * ) Notice: Subject to any disclaimer, the term of this patent is extended or adjusted under 35 U.S.C. 154(b) by 14 days.

(21) Appl. No.: 13/983,787

(22) PCT Filed: Feb. 8, 2012

(86) PCT No.: PCT/FR2012/050270
§ 371 (c)(1),
(2), (4) Date: Aug. 6, 2013

(87) PCT Pub. No.: WO2012/107689
PCT Pub. Date: Aug. 16, 2012

(65) Prior Publication Data
US 2013/0310518 A1 Nov. 21, 2013

(30) Foreign Application Priority Data
Feb. 10, 2011 (FR) ...................... 11 51086

(51) Int. Cl.
*C08F 10/02* (2006.01)
*C08F 110/02* (2006.01)

(52) U.S. Cl.
CPC .............. *C08F 10/02* (2013.01); *C08F 110/02* (2013.01)

(58) Field of Classification Search
CPC ....................................................... C08F 10/02
USPC .................................. 526/227, 228
See application file for complete search history.

(56) References Cited

U.S. PATENT DOCUMENTS

| | | | | |
|---|---|---|---|---|
| 2,650,913 A | * | 9/1953 | Boyd | 526/227 |
| 3,118,866 A | * | 1/1964 | Gregorian | 525/387 |
| 3,714,135 A | * | 1/1973 | Pfannmueller et al. | 526/219.2 |
| 3,764,628 A | * | 10/1973 | Gregorian et al. | 568/561 |
| 4,804,775 A | | 2/1989 | Kamath et al. | |
| 4,840,996 A | * | 6/1989 | Wild et al. | 525/193 |
| 5,973,087 A | * | 10/1999 | Luft et al. | 526/184 |
| 6,602,966 B1 | * | 8/2003 | Vargas et al. | 526/64 |
| 6,610,768 B1 | * | 8/2003 | Jelenic et al. | 524/386 |
| 7,078,457 B2 | * | 7/2006 | Amick et al. | 524/556 |
| 2002/0019502 A1 | * | 2/2002 | Hammer et al. | 526/61 |
| 2004/0214971 A1 | * | 10/2004 | Gonioukh et al. | 526/227 |
| 2004/0220358 A1 | * | 11/2004 | Zoller | 526/64 |
| 2006/0149004 A1 | | 7/2006 | Lee et al. | |
| 2007/0032614 A1 | * | 2/2007 | Goossens et al. | 526/65 |
| 2008/0226891 A1 | | 9/2008 | Chiga et al. | |
| 2010/0093961 A1 | * | 4/2010 | Aerts et al. | 526/227 |
| 2012/0108758 A1 | * | 5/2012 | Laignel et al. | 525/330.3 |
| 2013/0310518 A1 | * | 11/2013 | Nicol et al. | 524/855 |

FOREIGN PATENT DOCUMENTS

| | | | |
|---|---|---|---|
| EP | 0259537 A2 | | 3/1988 |
| EP | 0273090 A1 | | 7/1988 |
| FR | 2946653 A1 | | 12/2010 |
| WO | WO 2008/112373 | * | 9/2008 |
| WO | WO 2008/112373 A1 | | 9/2008 |

OTHER PUBLICATIONS

International Search Report (PCT/ISA/210) issued on Apr. 4, 2012, by the European Patent Office as the International Searching Authority for International Application No. PCT/FR2012/050270.

* cited by examiner

*Primary Examiner* — Michael Pepitone
*Assistant Examiner* — Michael A Salvitti
(74) *Attorney, Agent, or Firm* — Buchanan Ingersoll & Rooney P.C.

(57) ABSTRACT

A method for manufacturing polyethylene or an ethylene copolymer, including a step of free radical polymerization or copolymerization of the ethylene at an initiation temperature varying from 150° C. to 200° C., at a pressure varying from 500 to 3000 bar, in the presence of a peroxidic polymerization initiator selected from among the peroxide compounds of formula (I) in which R1 and R8 are, separately, a C2-C6 alkyl group; R2, R3, R6 and R7 are, separately, a C1-C5 alkyl group; and R4 and R5 are, separately, a C1-C6 alkyl group.

16 Claims, No Drawings

FREE RADICAL POLYMERISATION OF ETHYLENE INITIATED BY ORGANIC PEROXIDES WITH HIGH PRODUCTIVITY

The present invention relates to a process for manufacturing polyethylene or an ethylene copolymer by high-pressure polymerization in the presence of a particular peroxide polymerization initiator in a particular temperature range.

Low-density polyethylenes and ethylene copolymers are generally manufactured in an autoclave reactor or tubular reactor under very high pressure, by continuous introduction of ethylene, of one or more optional comonomers and of one or more organic peroxide initiators generally diluted in an organic solvent. The pressure inside the reactor is generally between 500 and 5000 bar. The temperature during the initiation of the reaction is generally between 80 and 250° C. The maximum reaction temperature is generally between 120 and 350° C.

The degree of conversion into polymer generally obtained with this type of process is about from 15% to 25%. In the same way, the productivity of such a process, expressed in grams of polyethylene produced per gram of peroxide initiator used, is generally between 1000 and 3000 g/g, and more particularly less than 2500 g/g.

The search for gain in productivity and therefore cost is a constant preoccupation of polyethylene producers. There is a need for a polyethylene manufacturing process which has a high productivity while at the same time retaining an advantageous degree of conversion into polymer.

A process for polymerizing ethylene in the presence of a 2,2-bis-(tertiary butyl peroxy)butane is known from document U.S. Pat. No. 2,650,913, but this initiator results in a low productivity (cf. example 1 of that document and test 3 below).

Also known is document FR 2 946 653 which discloses 2,2-di(t-amylperoxy)propane, but the latter is absolutely not used as a initiator.

Finally, documents US 2008/0226891, EP 0273090 and EP 0259537 are known, which disclose the use of 2,2-di(t-amyl peroxy)butane, but the latter is used for the manufacture of polymers that are very distinct from ethylene polymers or ethylene copolymers.

The applicant has discovered, surprisingly, that the use, at a temperature ranging from 150 to 200° C., of a peroxide initiator of formula

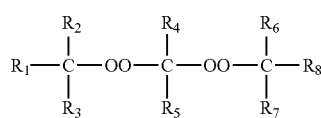

wherein R1 and R8 independently represent a $C_2$-$C_6$ alkyl group, R2, R3, R6 and R7 independently represent a $C_1$-$C_5$ alkyl group, and R4 and R5 independently represent a $C_1$-$C_6$ alkyl group, makes it possible to solve these problems, and to obtain a productivity of greater than 3000 g/g, while at the same time retaining a degree of conversion into polymer of between 13% and 25%.

The subject of the invention is therefore a process for manufacturing polyethylene or an ethylene copolymer, comprising a step of free-radical polymerization or copolymerization of ethylene at a pressure ranging from 500 to 3000 bar.

According to the invention, the polymerization or copolymerization is initiated at an initiation temperature ranging from 150 to 200° C., in the presence of a peroxide polymerization initiator chosen from the peroxide compounds of formula

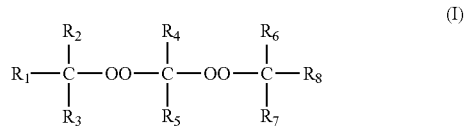

wherein
R1 and R8 independently represent a $C_2$-$C_6$ alkyl group,
R2, R3, R6 and R7 independently represent a $C_1$-$C_5$ alkyl group, and
R4 and R5 independently represent a $C_1$-$C_6$ alkyl group.

According to a first embodiment, R2, R3, R4, R6 and R7 each represent a methyl group.

According to a second embodiment, R1 and R8 independently represent a $C_2$-$C_4$ alkyl group.

According to a third embodiment, R5 represents a $C_2$-$C_4$ alkyl group.

These three embodiments can be combined in pairs or all three together.

Thus, according to one particular embodiment, R2, R3, R4, R6 and R7 can each represent a methyl group and R1 and R8 can independently represent a $C_2$-$C_4$ alkyl group.

According to another particular embodiment, R2, R3, R4, R6 and R7 can each represent a methyl group and R5 can represent a $C_2$-$C_4$ alkyl group.

According to another particular embodiment, R1 and R8 can independently represent a $C_2$-$C_4$ alkyl group and R5 can represent a $C_2$-$C_4$ alkyl group.

According to another particular embodiment, R2, R3, R4, R6 and R7 can each represent a methyl group, R1 and R8 can independently represent a $C_2$-$C_4$ alkyl group, and R5 can represent a $C_2$-$C_4$ alkyl group.

According to one particularly preferred embodiment, the peroxide polymerization initiator is 2,2-di(tert-amylperoxy) butane.

The peroxide polymerization initiator is generally present in a weight amount of between 20 and 1000 ppm relative to the weight amount of ethylene.

The polymerization initiator is generally diluted in a solvent or a mixture of solvents. The solvent(s) may be chosen from $C_1$-$C_{20}$ alkanes.

As previously explained, the polymerization or copolymerization of the ethylene is carried out at an initiation temperature ranging from 150 to 200° C., preferably from 160 to 190° C.

The polymerization or copolymerization can be carried out in the presence also of an additional peroxide initiator.

This additional peroxide initiator can be chosen from tert-butyl peroxyneodecanoate, tert-butyl peroxypivalate, tert-amyl peroxypivalate, bis(3,5,5-trimethyl-hexanoyl) peroxide, dodecanoyl peroxide, tert-amyl peroxy-2-ethylhexanoate, tert-butyl peroxy-2-ethylhexanoate, tert-butyl peroxy-3,5,5-trimethylhexanoate, tert-amyl peroxy-3,5,5-trimethylhexanoate, tert-butyl peroxybenzoate, tert-butyl peroxyacetate and di-tert-amyl peroxide.

The polymerization or copolymerization can be carried out in the presence of at least one additive, preferably chosen from antioxidants; UV protection agents; processing agents, having the function of improving the final appearance when it is used, such as fatty amides, stearic acid and its salts, ethylenebis(stearamide) or fluoro polymers; antifogging agents;

antiblocking agents, such as silica or talc; fillers, such as calcium carbonate, and nanofillers, for instance clays; coupling agents, such as silanes; crosslinking agents, such as peroxides; antistatic agents; nucleating agents; pigments; dyes; plasticizers; fluidizers and flame-retardant additives, such as aluminum hydroxide or magnesium hydroxide.

These additives are generally used in contents of between 10 ppm and 10 000 ppm by weight relative to the weight of the final polyethylene or ethylene copolymer. The plasticizers, the fluidizers or the flame-retardant additives can reach amounts well above 10 000 ppm.

The polymerization or copolymerization is carried out at a pressure ranging from 500 to 3000 bar, preferably from 1200 to 3000 bar and better still from 1200 to 2600 bar.

High-pressure polymerization is generally carried out in an autoclave reactor or tubular reactor. The reaction temperature is generally between 150° C. and 320° C.

When a tubular reactor is used, the mixture of the ethylene and of the optional comonomer(s) is preferably introduced at the top of the tubular reactor. The initiator or the mixture of initiators is injected using a high-pressure pump at the top of the reactor, after the site of introduction of the mixture of the ethylene and of the optional comonomer(s).

The mixture of the ethylene and of the optional comonomer(s) can be injected at at least one other point of the reactor; this injection is itself followed by a further injection of initiator or of mixture of initiators, and the term multipoint injection technique is then used. When the multipoint injection technique is used, the mixture is preferentially injected in such a way that the weight ratio of the mixture injected at the reactor inlet to the total mixture injected is between 10% and 90%.

Other tubular high-pressure polymerization or copolymerization processes which can be used are, for example, those described in US 2006/0149004 A1 or in US 2007/0032614 A1.

It is also possible to use an autoclave reactor for carrying out the free-radical high-pressure polymerization.

An autoclave reactor generally consists of a cylindrical reactor in which a stirrer is placed. The reactor can be separated into several zones connected to one another in series. Advantageously, the residence time in the reactor is between 30 and 120 seconds. Preferentially, the length/diameter ratio of the reactor is between 3 and 25. The ethylene alone and the optional comonomer(s) are injected into the first zone of the reactor at a temperature of between 50 and 120° C. An initiator is also injected into this first reaction zone when the reaction zone reaches a temperature of between 150 and 200° C. During the reaction, the temperature can be between 150 and 320° C., since the reaction is exothermic. If the reactor is a multizone reactor, the stream of ethylene and of optional comonomers which have not reacted and also the polymer formed then pass through the subsequent reaction zones. In each reaction zone, ethylene, optional comonomers and initiators can be injected, at an initiation temperature of between 150 and 200° C. The temperature of the zones after initiation is between 150 and 320° C. The pressure of the reactor ranges from 500 to 3000 bar, preferentially from 1200 to 3000 bar and better still from 1200 to 2600 bar.

The invention is illustrated by the examples which follow.

EXAMPLE 1

Polymerization of ethylene is carried out with a conventional initiator, tert-butyl peroxy-3,5,5-trimethylhexanoate (sold by the company Arkema under the reference Luperox® 270).

In a 435 ml high-pressure stirred reactor of autoclave type, ethylene is injected until a pressure of 1800 bar is reached, i.e. approximately 207 g. The reactor wall temperature is then fixed at 177° C. by means of heater rods placed in the walls of the reactor.

The temperature of the reaction medium in the reactor is measured by means of two thermocouples.

The tert-butyl peroxy-3,5,5-trimethylhexanoate (14.8 mg) is diluted in heptane (1.3 g) and propanaldehyde (0.89 g) upstream of the reactor and at low temperature (25° C.), so as not to initiate the reaction before the entry into the reactor. This mixture is then injected into the reactor using a high-pressure pump. The polymerization is initiated as soon as the peroxide is injected at an initial temperature of 177° C. (initiation temperature).

The reaction is allowed to take place until the final temperature returns to the same value level as the initial temperature (i.e. a test time of approximately 25 to 50 minutes).

At the outlet of the reactor, the ethylene/polyethylene mixture is directly decompressed to 3 bar and the polymer is separated from the unreacted ethylene by passing it through a separation vessel.

The amount of polymer recovered after polymerization is determined by weighing, which makes it possible to express the degree of conversion into polymer, the specific peroxide consumption and the productivity of the process.

The productivity is expressed in grams of polyethylene produced per gram of peroxide initiator used.

The conversion is defined by the amount of polyethylene produced relative to the amount of ethylene introduced.

The results are the following:
Degree of conversion into polyethylene: 10.2%
Amount of low-density polyethylene produced: 22.4 g
Productivity: 1510 g/g.

It is therefore concluded therefrom that the conventional peroxide initiators result in a low productivity.

EXAMPLE 2

Polymerization of ethylene is carried out according to the invention with the initiator 2,2-di(tert-amyl-peroxy)butane (sold by the company Arkema under the reference Luperox® 520M50).

The procedure described in example 1 is reproduced, except for the fact that the 14.8 mg of tert-butyl peroxy-3,5,5-trimethylhexanoate are replaced with 10.2 mg of 2,2-di(tert-amylperoxy)butane used according to the invention.

The results are the following:
Degree of conversion into polyethylene: 13.9%
Amount of low-density polyethylene produced: 30.7 g
Productivity: 3010 g/g.

The use of the 2,2-di(tert-amylperoxy)butane initiator during a polymerization at a temperature of between 150 and 200° C. therefore makes it possible to obtain a high conversion and a high productivity.

EXAMPLE 3

Polymerization of ethylene is carried out according to the invention with the initiator 2,2-di(tert-amyl-peroxy)butane.

The procedure described in example 2 is reproduced, except for the fact that the initial polymerization temperature (initiation temperature) is changed. Said temperature is fixed at 192° C. instead of 177° C. The initiation is carried out according to the invention as in example 2 with 10.2 mg of 2,2-di(tert-amylperoxy)-butane.

The results are the following:
Degree of conversion into polyethylene: 14.4%
Amount of low-density polyethylene produced: 31.1 g
Productivity: 3100 g/g.

The use of the 2,2-di(tert-amylperoxy)butane initiator during a polymerization at a temperature of between 150 and 200° C. therefore makes it possible to obtain a high conversion and a high productivity.

EXAMPLE 4

Conventional polymerization of ethylene is carried out with a 2,2-di(tert-amylperoxy)butane initiator, but at a temperature above the temperature used in the process according to the invention.

Thus, the procedure described in example 2 is reproduced, except for the fact that the initial polymerization temperature (initiation temperature) is fixed at 215° C., and not 177° C.

The initiation is carried out as in example 2 with 10.2 mg of 2,2-di(tert-amylperoxy)butane.

The results are the following:
Degree of conversion into polyethylene: 5.7%
Amount of low-density polyethylene produced: 12.1 g
Productivity: 1200 g/g.

Thus, an ethylene polymerization carried out at a temperature above 200° C. results in a low conversion and a low productivity.

Supplementary tests were carried out in order to compare the process for manufacturing polyethylene or an ethylene copolymer according to the invention (tests and 2 below) with a process according to the prior art (according to document U.S. Pat. No. 2,650,913 in which the initiator is 2,2-bis(tertiary butyl peroxy). Only in the case of the initiators of tests 1 and 2 is it possible to obtain a productivity greater than 3000 g/g with a degree of conversion into polymer of between 13% and 25%, whereas, with the abovementioned initiator targeted in document U.S. Pat. No. 2,650,913, these objectives are not achieved.

Test 1: Polymerization with Initiation Using 2,2-di(tert-amylperoxy)butane (According to the Invention) or Luperox® 520M50:

Polymerization of ethylene according to the invention is carried out with the 2,2-di(tert-amylperoxy)butane initiator (sold by the company Arkema under the reference Luperox® 520M50).

In a 435 ml high-pressure stirred reactor of autoclave type, the ethylene is injected until a pressure of 1800 bar is reached, i.e. approximately 207 g. The reactor wall temperature is then fixed at 177° C. by means of heater rods placed in the walls of the reactor.

The temperature of the reaction medium in the reactor is measured by means of two thermocouples.

The 2,2-di(tert-amylperoxy)butane (10.2 mg) is diluted in heptane (1.3 g) and propanaldehyde (0.89 g) upstream of the reactor and at low temperature (25° C.), so as not to initiate the reaction before the entry into the reactor. This mixture is then injected into the reactor using a high-pressure pump. The polymerization is initiated as soon as the peroxide is injected at an initial temperature of 177° C. (initiation temperature).

The reaction is allowed to take place until the final temperature returns to the same value level as the initial temperature (i.e. a test time of approximately 25 to 50 minutes).

At the reactor outlet, the ethylene/polyethylene mixture is directly decompressed to 3 bar and the polymer is separated from the unreacted ethylene by passing it through a separation vessel.

The amount of polymer recovered after polymerization is determined by weighing, which makes it possible to express the degree of conversion into polymer, the specific peroxide consumption and the productivity of the process.

The productivity is expressed in grams of polyethylene produced per gram of peroxide initiator used.

The conversion is defined by the amount of polyethylene produced relative to the amount of ethylene introduced.

In the test, the following results were recorded:
Degree of conversion into polyethylene: 13.9%
Amount of low-density polyethylene produced: 30.7 g
Productivity: 3010 g/g.

Test 2—Polymerization with Initiation Using 2,2-di(tert-amylperoxy)butane (Invention) or Luperox® 520M50:

Polymerization of ethylene is carried out according to the invention with the initiator 2,2-di(tert-amyl-peroxy)butane.

The procedure described in the previous test (test 1) is reproduced, except for the fact that the initial polymerization temperature (initiation temperature) is changed. Said temperature is fixed at 192° C. instead of 177° C. The initiation is carried out as in the previous test with 10.2 mg of 2,2-di(tert-amylperoxy)butane.

The results are the following:
Degree of conversion into polyethylene: 14.4%
Amount of low-density polyethylene produced: 31.1 g
Productivity: 3100 g/g.

The use of the 2,2-di(tert-amylperoxy)butane initiator during a polymerization at a temperature of between 150 and 200° C. therefore clearly makes it possible to obtain a high conversion and a high productivity (conversion>13% and productivity>3000 g/g).

Test 3—Polymerization with Initiation Using 2,2-di(tert-butylperoxy)butane:

Conventional polymerization of ethylene is carried out according to the invention with the initiator 2,2-di(tert-butylperoxy)butane.

Thus, the procedure described in test 1 is reproduced, except for the fact that the 2,2-di(tert-amylperoxy)-butane initiator is replaced with 2,2-di(tert-butyl-peroxy)butane.

The initiation is carried out with 10.2 mg of 2,2-di(tert-butylperoxy)butane.

The results are the following:
Degree of conversion into polyethylene: 11.9%
Amount of low-density polyethylene produced: 24.6 g
Productivity: 2410 g/g.

It is concluded therefrom that 2,2-di(tert-butylperoxy)butane results in a lower productivity (<3000 g/g) with a conversion lower than 13%.

The invention claimed is:

1. A process for manufacturing polyethylene or an ethylene copolymer, comprising a step of free-radical polymerization or copolymerization of ethylene at an initiation temperature ranging from 150 to 200° C., at a pressure ranging from 500 to 3000 bar, in the presence of a peroxide polymerization initiator chosen from the peroxide compounds of formula

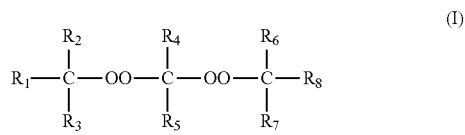

wherein
R1 and R8 independently represent a $C_2$-$C_6$ alkyl group,
R2, R3, R6 and R7 independently represent a $C_1$-$C_5$ alkyl group, and
R4 and R5 independently represent a $C_1$-$C_6$ alkyl group.

2. The process as claimed in claim 1, wherein R2, R3, R4, R6 and R7 each represent a methyl group.

3. The process as claimed in claim 1, wherein R1 and R8 independently represent a $C_2$-$C_4$ alkyl group.

4. The process as claimed in claim 1, wherein R5 represents a $C_2$-$C_4$ alkyl group.

5. The process as claimed in claim 1, wherein the peroxide polymerization initiator is 2,2-di(tert-amylperoxy)butane.

6. The process as claimed in claim 1, wherein the polymerization or copolymerization of the ethylene is carried out at an initiation temperature ranging from 160 to 190° C.

7. The process as claimed in claim 1, wherein the polymerization or copolymerization is carried out in the presence also of an additional peroxide initiator.

8. The process as claimed in claim 1, wherein the polymerization or copolymerization is carried out in the presence of at least one additive chosen from antioxidants; UV protection agents; processing agents; antifogging agents; antiblocking agents; fillers; coupling agents; crosslinking agents; antistatic agents; nucleating agents; pigments; dyes; plasticizers; fluidizers and flame-retardant additives.

9. The process as claimed in claim 1, wherein R2, R3, R4, R6 and R7 each represent a methyl group, wherein R1 and R8 independently represent a $C_2$-$C_4$ alkyl group, and wherein R5 represents a $C_2$-$C_4$ alkyl group.

10. The process as claimed in claim 9, wherein the peroxide polymerization initiator is 2,2-di(tert-amylperoxy)butane.

11. The process as claimed in claim 9, wherein the polymerization or copolymerization of the ethylene is carried out at an initiation temperature ranging from 160 to 190° C.

12. The process as claimed in claim 9, wherein the polymerization or copolymerization is carried out in the presence also of an additional peroxide initiator.

13. The process as claimed in claim 9, wherein the polymerization or copolymerization is carried out in the presence of at least one additive chosen from antioxidants; UV protection agents; processing agents; antifogging agents; antiblocking agents; fillers; coupling agents; crosslinking agents; antistatic agents; nucleating agents; pigments; dyes; plasticizers; fluidizers and flame-retardant additives.

14. The process as claimed in claim 7, wherein the additional peroxide polymerization initiator chosen from tert-butyl peroxyneodecanoate, tert-butyl peroxypivalate, tert-amyl peroxypivalate, bis(3,5,5-trimethyl-hexanoyl) peroxide, dodecanoyl peroxide, tert-amyl peroxy-2-ethylhexanoate, tert-butyl peroxy-2-ethylhexanoate, tert-butyl peroxy-3,5,5-trimethylhexanoate, tert-amyl peroxy-3,5,5-trimethylhexanoate, tert-butyl peroxybenzoate, tert-butyl peroxyacetate and di-tert-amyl peroxide.

15. The process as claimed in claim 1, wherein the pressure ranges from 1200 to 2600 bar.

16. The process as claimed in claim 1, wherein the free-radical polymerization or copolymerization takes place in an autoclave reactor or a tubular reactor.

* * * * *